US010038371B2

(12) United States Patent
Boucly et al.

(10) Patent No.: US 10,038,371 B2
(45) Date of Patent: Jul. 31, 2018

(54) DEVICE FOR SYNCHRONIZING VARIABLE FREQUENCY DC/DC CURRENT CONVERTERS

(71) Applicant: Technoboost, Paris (FR)

(72) Inventors: Bernard Boucly, Le Chesnay (FR); Eric Lecrux, La Boissière École (FR)

(73) Assignee: TECHNOBOOST, Paris (FR)

( * ) Notice: Subject to any disclaimer, the term of this patent is extended or adjusted under 35 U.S.C. 154(b) by 0 days.

(21) Appl. No.: 14/433,355

(22) PCT Filed: Sep. 27, 2013

(86) PCT No.: PCT/FR2013/052286
§ 371 (c)(1),
(2) Date: Apr. 2, 2015

(87) PCT Pub. No.: WO2014/053750
PCT Pub. Date: Apr. 10, 2014

(65) Prior Publication Data
US 2015/0263607 A1    Sep. 17, 2015

(30) Foreign Application Priority Data

Oct. 2, 2012   (FR) ..................................... 12 59318

(51) Int. Cl.
*H02M 3/158*     (2006.01)
*H02M 3/04*      (2006.01)
*H02M 3/156*     (2006.01)
*H02M 1/08*      (2006.01)

(52) U.S. Cl.
CPC .............. *H02M 3/04* (2013.01); *H02M 1/08* (2013.01); *H02M 3/156* (2013.01); *H02M 3/1563* (2013.01); *H02M 3/1584* (2013.01); H02M 2003/1586 (2013.01)

(58) Field of Classification Search
CPC .. H02M 3/1563; H02M 3/1584; H02M 3/156; H02M 3/1588; H02M 2003/1586
See application file for complete search history.

(56) References Cited

U.S. PATENT DOCUMENTS 5,793,191 A    8/1998 Elmore et al.
7,933,132 B2   4/2011 Bridge et al.
(Continued)

OTHER PUBLICATIONS

International Search Report of corresponding application PCT/FR2013/052286 dated Jan. 27, 2014.

*Primary Examiner* — Timothy J Dole
*Assistant Examiner* — Ishrat Jamali
(74) *Attorney, Agent, or Firm* — Sandberg Phoenix & Von Gontard PC

(57) ABSTRACT

The invention concerns a device (3) for synchronizing at least two DC/DC converters. It is characterized in that it comprises receiving means (21A, 21B, 23A, 23B) for receiving a switching signal generated by each of the converters; means (25) for detecting a transition type of the received switching signals; means (27) for generating a synchronization signal when a transition is detected; and means (27, S1, S2) for supplying the synchronization signal to one of the converters, said means (27, S1, S2) being configured to supply the synchronization signal to a different converter and in an order of succession each time a transition is detected.

8 Claims, 16 Drawing Sheets

(56) References Cited

U.S. PATENT DOCUMENTS

| | | | |
|---|---|---|---|
| 2009/0237133 A1* | 9/2009 | Yang | H02M 3/1584 327/161 |
| 2013/0088196 A1* | 4/2013 | Chen | B60L 11/1811 320/109 |

* cited by examiner

DEVICE FOR SYNCHRONIZING VARIABLE FREQUENCY DC/DC CURRENT CONVERTERS

CROSS-REFERENCE TO RELATED APPLICATIONS

The present invention is the US national stage under 35 U.S.C. § 371 of International Application No. PCT/FR2013/052286 which was filed on Sep. 27, 2013 and which claims the priority of French applications 1259318 filed Oct. 2, 2012, the contents of which (texts, drawings and claims) are incorporated herein by reference.

BACKGROUND

The present invention generally relates to a device for synchronizing at least two converters and more specifically a device for synchronizing at least two variable frequency voltage step-down/step-up (DC/DC) current converters for a vehicle.

Existing interlaced multi-phase converters in the automotive industry function at fixed frequency (e.g. 150 kHz for each phase). However, conducted and radiated emissions are present on a narrow radio frequency spectrum and filters are necessary to meet the required EMI standards for vehicle components.

In addition, converters operating at a fixed frequency do not maintain regulation stability at duty cycles in excess of 50% and this limits the power output of the converters.

In addition, these fixed frequency interlaced converters, in principle, require a minimum control duty cycle (e.g. 1%) to maintain a phase-lock loop stability of the output voltage. This principle thus involves consuming at least a current load of a few amperes, which suggests poor performances.

Variable frequency converters are hard to interlace. Synchronized operations of several converters operating at different frequencies is difficult to implement because it requires complex systems namely when synchronizing is required over an extended range of frequencies.

Synchronism often requires a digital device to calculate at each period the exact synchronization moment for each converter. In general the operating frequency range is very limited.

Moreover, the synchronizing device usually generates a total shutdown of all converters when the device fails.

U.S. Pat. No. 7,933,132 describes a system including multiple variable frequency converters, a synchronization circuit associated to each converter to synchronize same frequency operation of each converter and a control device for synchronizing the operation of synchronization circuits.

BRIEF SUMMARY

An objective of the present invention is to address the above mentioned issues and, in particular, to provide a synchronizing device allowing to interlace and synchronize the operation of at least two variable frequency voltage step-down/step-up DC/DC current converters over the whole operating frequency range of the converters.

Accordingly, a first aspect of the invention relates to a device for synchronizing at least two DC/DC current converters characterized by:

Means for receiving a switching signal generated by each of the converters;
Means for detecting a transition type from received switching signals;
Means for generating a synchronization signal when a transition is detected; and
Means for delivering the synchronization signal to one of the converters, the means being configured to deliver the synchronization signal to a different converter in sequence each time a transition is detected.

Such a synchronizing device synchronizes operation of multiple DC/DC variable frequency converters over the entire operating frequency range of the converters. Step-down or step-up voltage converters can operate interlaced regardless of the operating frequency of the converters (e.g., in a range of 4 kHz to 40 kHz). In addition, a synchronization failure does not cause a forced stop of all converters. And it allows reducing ripple current in the filtering ability.

Preferably, the invention also comprises means for synchronizing capable of providing a synchronization signal to a predetermined converter.

In a preferred embodiment, the synchronization starter means include methods for receiving a value of a current flowing through an inductance of a converter among converters and means to generate a starter signal when the value of the current reaches a predetermined value. This allows for a good start to the synchronization.

Preferably, the starter means of the synchronization include means for receiving a voltage representative of a current flowing through a converter inductance among converters, and means to generate a starter signal when the value of said current reaches a predetermined value.

Preferably, the receiving means include a differentiating circuit for processing the switching signal received from each converter.

In a preferred embodiment, the receiving means include a shaping circuit for processing the switching signal received from each converter.

More preferably, the detecting means to detect a transition type of switching signals include an OR circuit.

In a preferred embodiment, the means for generating a synchronization signal when a transition is detected include a D toggle.

In a particularly interesting realization, the converters are variable frequency converters.

As a second component, the present invention relates to a system composed of a synchronizing device as defined above, at least two interlaced voltage step-up converters or at least two interlaced voltage step-down converters, and an adder associated with each converter for adding the synchronizing signal to a control signal delivered to the converter.

As a third component, the present invention relates to a motor vehicle including a synchronizing device as defined above, or a system as defined above.

BRIEF DESCRIPTION OF THE FIGURES

Other features and advantages of the present invention shall become clearer from the following detailed description of an implementation method of the invention, provided as non-limiting examples, and illustrated by the accompanying drawings, in which.

DESCRIPTION

Figure 1:
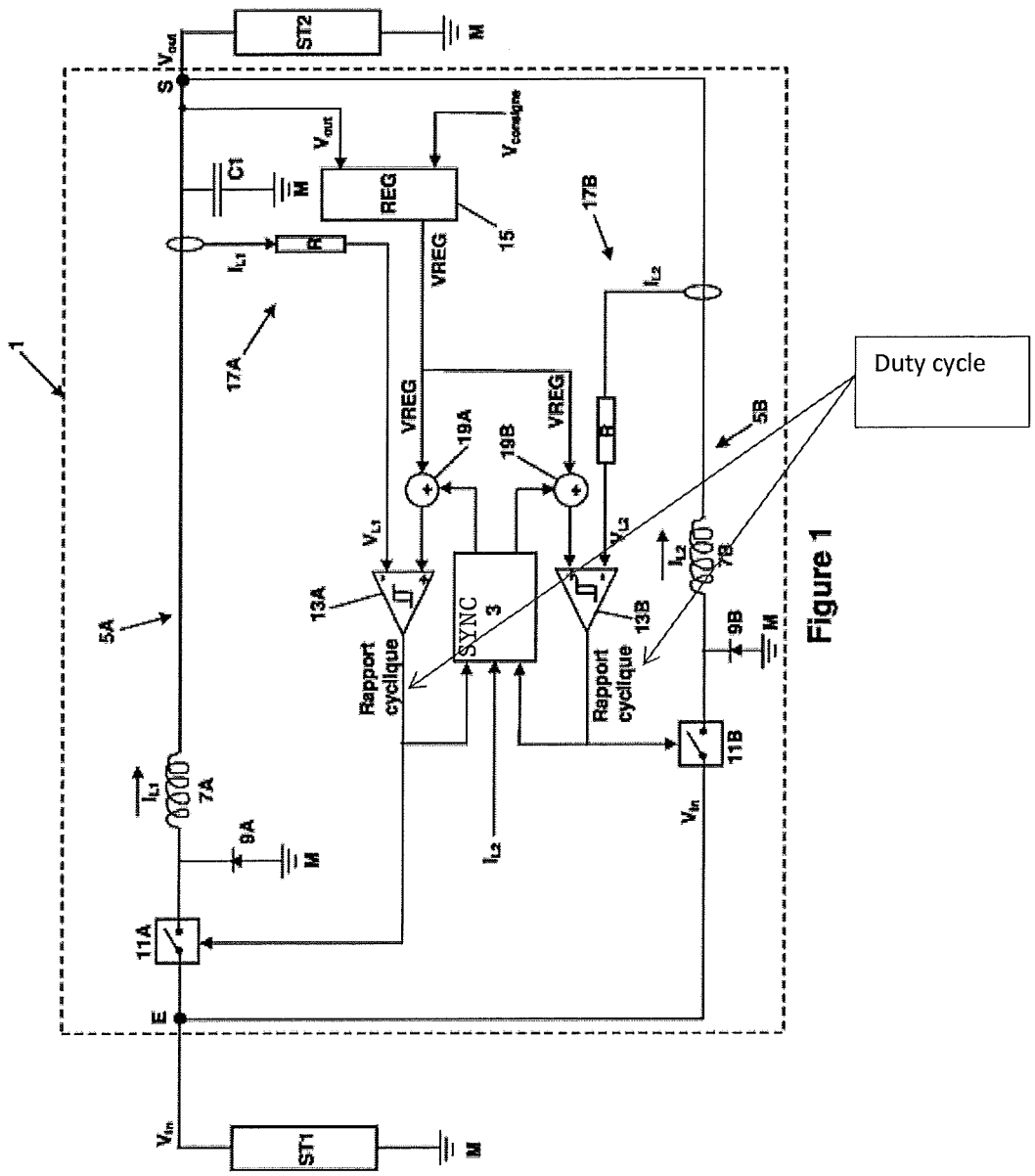
FIG. 1 illustrates a system including a synchronizing device and two voltage step-down converters according to the present invention.

FIG. 1 illustrates a system 1 including a synchronizing device 3 and two variable frequency voltage step-down converters 5A, 5B according to the present invention. Each converter 5 is regulated in current mode.

Each converter 5 includes an inductance 7, a diode 9, a switch 11, a generator 13, e.g. a hysteresis comparator for generating a switching signal to control the switch 11 in order to generate a current through the inductance 7 and a controller 15 to provide a non-inverting input to the hysteresis comparator, a VREG regulation voltage of the current flowing through the inductance 7.

In the implementation method illustrated in FIG. 1, there is only one regulator 15 and the converters 5A, 5B share the same regulator 15.

Each converter 5A, 5B includes means 17 to provide VL1 voltage and VL2 voltage (an image of the IL1 and IL2 current) representative of the IL1 and IL2 current flowing through the inductance 7A and inductance 7B respectively to an inverting input of the hysteresis comparator 13A and an inverting input of the hysteresis comparator 13B. The means 17 include a resistance R to convert a sampling of the IL1 and IL2 current flowing through the inductance 7A, 7B in a voltage VL1, VL2.

System 1 also includes a filtering capacitor C1.

As illustrated in FIG. 1, the converters 5A and 5B are connected to a first electric energy storage device ST1 through an input terminal E to a second electric energy storage device ST2 through an output terminal S. The electric energy storage devices ST1 and ST2 are connected to a grounding device M. The first energy storage device ST1 is a battery such as an electrochemical battery and the second energy storage device ST2 is a supercapacitor or a battery or charges.

Each switch 11A, 11B is electrically connected on one side to the input terminal E and on the other side in series to the inductance 7A, 7B which in turn is connected on the other side to the output terminal S. Each diode 9A, 9B is electrically connected on the cathode side between the switch and the inductance, and each diode 9A, 9B is electrically connected on the anode side to the grounding device M. The hysteresis comparator 13A is electrically connected to the switch 11A to transmit a switching signal allowing closing and opening of the switch 11A to generate a current in the inductance 7A. The hysteresis comparator 13B is electrically connected to the switch 11B to transmit a switching signal allowing closing and opening of the switch 11B to generate a current in the inductance 7B.

The hysteresis comparator 13A receives at its inverting input the VL1 voltage representative of the IL1 current flowing through the inductance 7A, and at its non-inverting input the VREG regulation voltage provided by the regulator 15. The hysteresis comparator 13B receives at its inverting input the VL2 voltage representative of the IL2 current flowing through the inductance 7B and at its non-inverting input the VREG regulation voltage provided by the regulator 15.

The controller 15 is capable of receiving a feedback voltage signal in a Vout output voltage from the converter (feedback), and a set point signal Vconsigne. The controller 15 is able to determine a VREG voltage regulation value from the Vout output voltage value, and from the value of the set point signal Vconsigne. The VREG voltage regulation is simultaneously supplied to the hysteresis comparator 13A and hysteresis comparator 13B, and the current flowing through the inductances 7A, 7B is regulated at the VREG voltage regulation values.

The filter capacitor C1 is electrically connected on one side between the inductance 7A of the capacitor 5A and the output terminal S, and on the other side to the grounding device M.

The two-phase system 1 also includes an adder 19A, 19B associated to each converter 5A, 5B. Each adder 19A, 19B is capable of adding a synchronizing signal delivered by the synchronizing device 3 to the VREG voltage regulation value supplied by the controller 15. The adder 19A is able to deliver the result to the non-inverting input of the hysteresis comparator 13A, and the adder 19B adder is able to deliver the result to the non-inverting input of the hysteresis comparator 13B.

Figure 2:
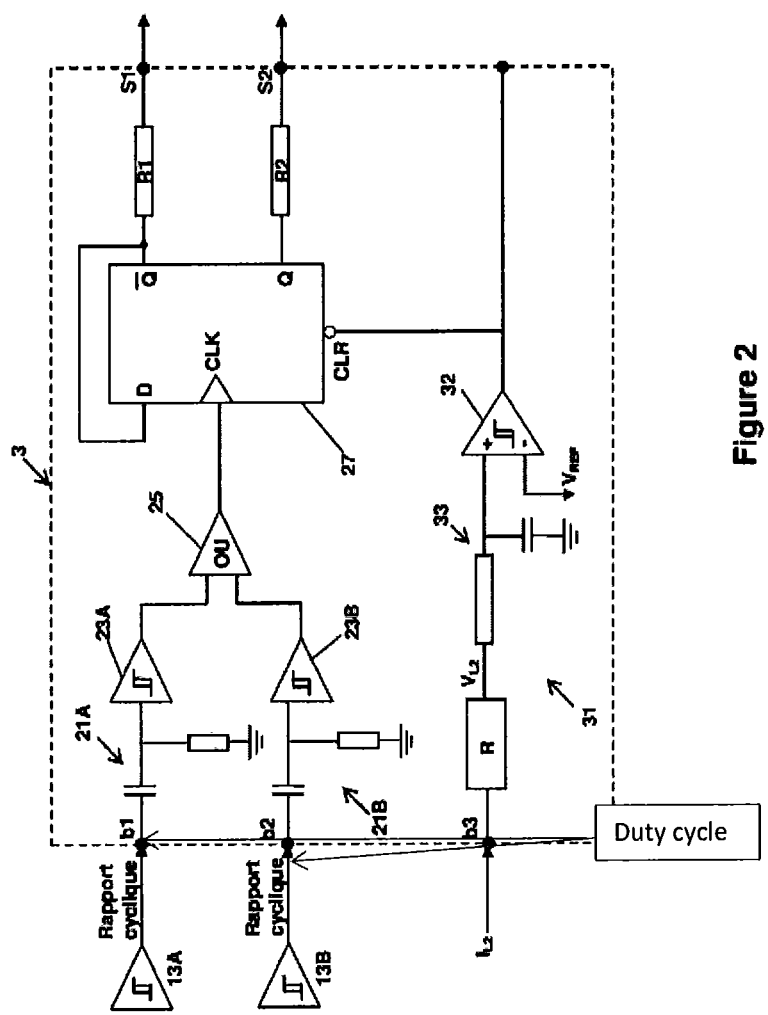
FIG. 2 illustrates a synchronizing device according to the present invention.

A detailed illustration of the synchronizing device 3 according to the present invention, is shown in FIG. 2.

The synchronizing device 3 is capable of receiving the switching signal from the hysteresis comparator 13A at a first input terminal b1 and to receive the switching signal from the hysteresis comparator 13B at a second input terminal b2.

The synchronizing device 3 includes reception means to receive the switching signal generated by each of the converters. The reception means include a differentiator circuit 21A and a shaping circuit 23A for receiving and processing the switching signal delivered by the hysteresis comparator 13A, and a differentiating circuit 21B and a shaping circuit 23B for receiving and processing the switching signal delivered by the hysteresis comparator 13B.

The synchronizing device 3 also includes means to detect a transition type of received switching signals. The means to detect a transition type include an OR circuit 25.

The differentiator circuit 21A is connected on one side to the first input terminal b1 and on the other side to the shaping circuit 23A. The shaping circuit 23A is also connected to an input terminal of the OR circuit. The differentiating circuit 21B is connected on one side to the first input terminal b2 and the other side to the shaping circuit 23B. The shaping circuit 23B is connected to the other input terminal of the OR circuit.

The synchronizing device 3 also includes means for generating a synchronization signal when a transition is detected and means to deliver the synchronization signal to one of the converters 5A, 5B.

The means for generating a synchronization signal when a transition is detected include a D 27 toggle.

The output of the OR circuit is connected to a CLK clock input of the toggle D. A Q output of the toggle D is connected to a resistance R2 (e.g., 200 kΩ) and the D toggle Q (Qbarre) complemented output is connected to a resistance R1 (e.g., 200 kΩ). The other input D of the D toggle is connected to the Q (Qbarre) complemented output and to the resistance R1.

The resistance R1 is also connected to a first output terminal S1 and the resistance R2 is connected to the second output terminal S2 of the device 3.

The D toggle is capable of alternately generating a synchronization signal to the output Q, and a synchronization signal to the Q (Qbarre) complemented output every time the CLK clock input receives an active signal from the OR circuit.

The means to deliver the synchronization signal to one of the converters 5A, 5B include the toggle D, the resistance R1 connected to the first output terminal S1 and the resistance R2 connected to the second output terminal S2.

The synchronizing device 3 receives as input the output switching signals from each converter 5A, 5B. The switching signals are pulse-width modulated signals (PWM) and the intensity of the current generated in the inductances 7A, 7B are determined by the duty cycle of said signals.

Each transition of the output switching signal from the comparator 13A is processed by the differentiating circuit 21A and by the shaping circuit 23A, and supplied to the input of the OR circuit. Each transition of the output switching signal from the comparator 13B is processed by the differentiating circuit 21B and by the shaping circuit 23B and supplied to the other input of the OR circuit.

Only positive transitions are taken into account by the OR circuit 25 and are supplied to the CLK clock input of toggle D. The toggle D alternates the Q and Qbarre output states at each positive transition received from the OR circuit on its CLK clock input. A synchronization signal (e.g., a signal of +5V) is produced alternately in the Q and Qbarre outputs. A synchronization signal is thus provided at a different converter (through resistances R1, R2) and in consecutive order (e.g., 5A, 5B, 5A, 5B . . . ) whenever a positive transition is detected by the OR circuit (if the system where to include three converters 5A, 5B and 5C, the order would then be, 5A, 5B, 5C, 5A, 5B, 5C . . . ).

The synchronization signal is supplied to the adder 19A or adder 19B through the resistance R1 or R2. The adder 19A or 19B adds the value of the VREG voltage regulation to the synchronization signal (e.g., a voltage of +290 mV). The result delivered to the non-inverting input of the hysteresis comparator to change the amplitude of the hysteresis comparator.

A voltage of 0V is supplied to the other adder, and the hysteresis comparator connected to the other adder only receives the value of the VREG voltage regulation at its non-inverting input.

The alternative supply of the synchronization signal to the adder 19A and to the adder 19B to change the amplitude of the hysteresis comparator when a positive transition is detected by the OR circuit allows to synchronize the operation of converters 5A and 5B.

The synchronizing device 3 also includes a synchronization starter device 31 capable of providing a synchronization signal to a predetermined converter.

The synchronization starter device 31 includes a comparator 32, a linear current/voltage gain converter R and a shaping circuit 33 capable of preventing simultaneous synchronization starts of the two converters 5A, 5B connected on one side to the non-inverting input of the comparator 32 and on the other side to an input terminal b3 through a linear current/voltage gain converter R. The device 31 also includes a VREF voltage reference source (e.g., a voltage equal to 10% of VREG voltage) connected to the inverting input of the comparator 32. The output of comparator 32 is connected to a CLR reset input of toggle D.

The device 31 ensures a proper start of the synchronization. The input terminal b3 receives the value of current IL1 or IL2 (an image of current IL1 or IL2) flowing through respectively inductance 7A or inductance 7B when powering a converter 5A or 5B or the system 1.

The comparator 32 compares the value of voltage VL1 or VL2 to the VREF voltage reference value. On a high value of current IL1 or IL2, the comparator 32 generates a reset impulse and provides this starter signal to toggle D. The toggle D is capable of providing a synchronization signal to a predetermined point, e.g., S1 when it receives the reset impulse. The output S1 of the synchronizing device 3 is thus initialized at a positive voltage (e.g., +290 mV) and the output S2 is initialized at zero voltage.

Then, as indicated above, the device 3 will provide a synchronization signal to output S2 when a positive transition is detected by the OR circuit (and then to the output S1, S2, S1, S2 . . . ).

Figure 3:
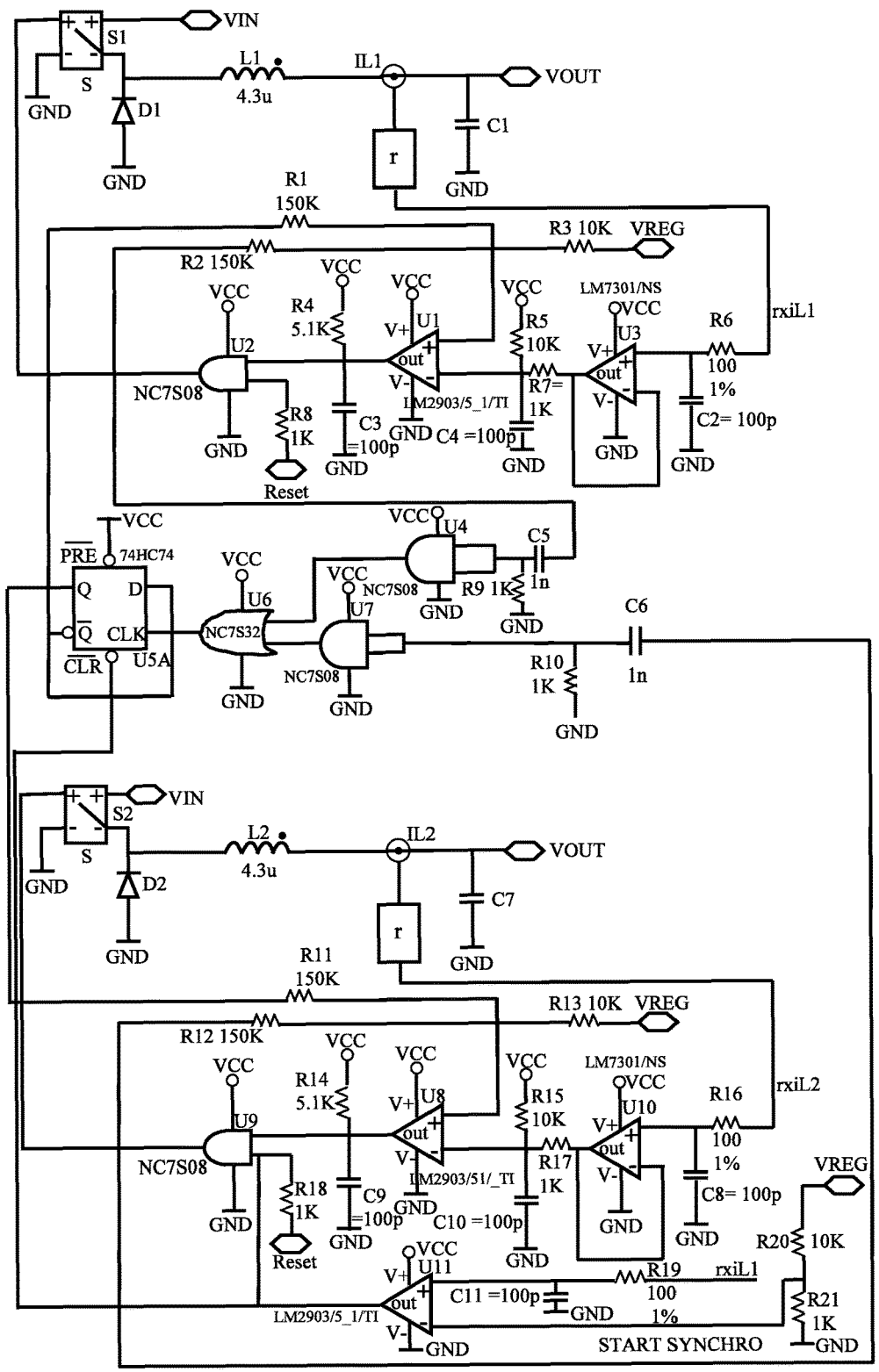
FIG. 3 illustrates an implementation example of a system including a synchronizing device and two voltage step-down converters according to the present invention.

FIG. 3 illustrates an implementation example of system 1.

Figure 4:
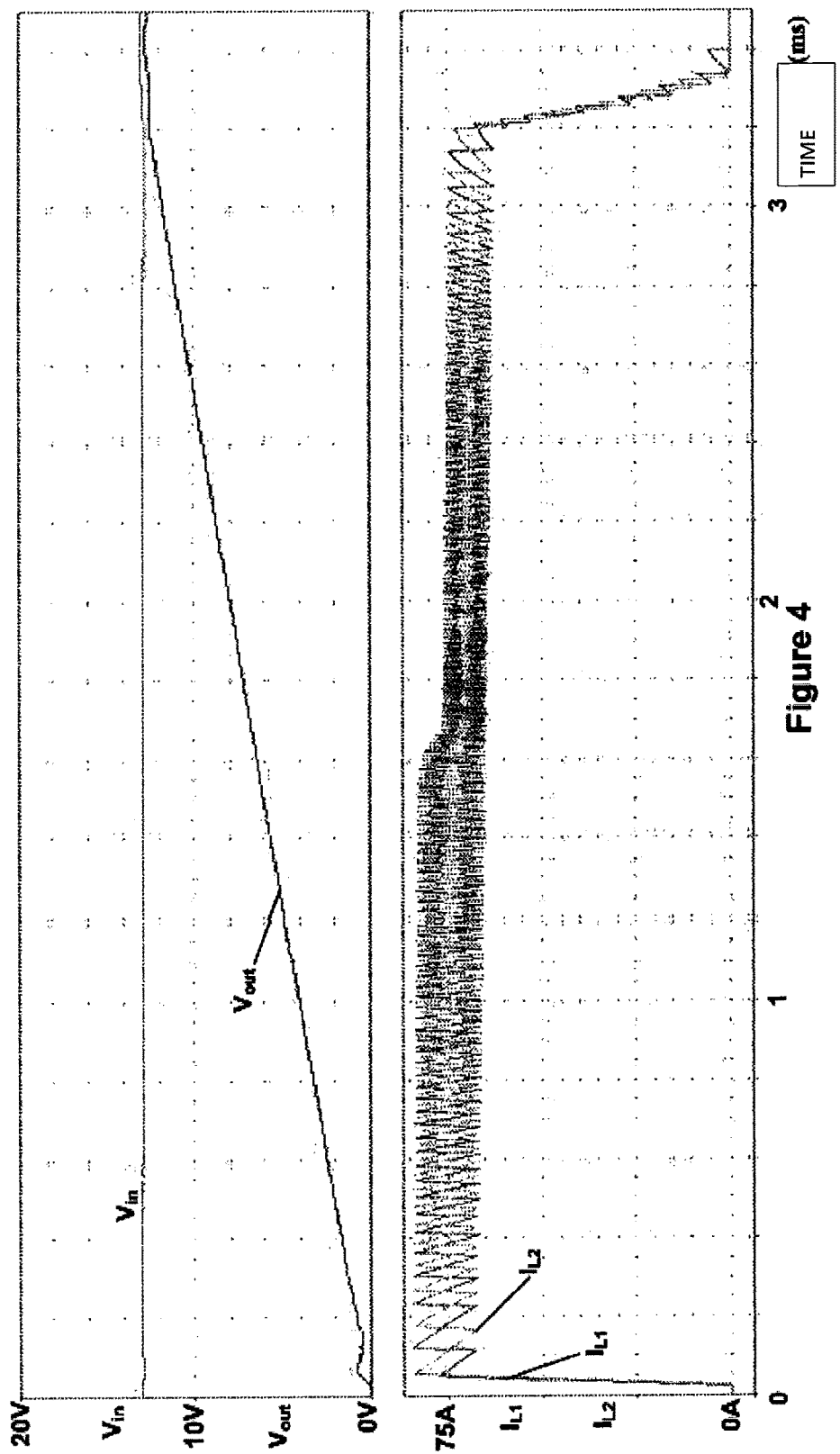
FIG. 4 illustrates the synchronized evolution of the current flowing through the inductance of each voltage step-down converter for the system illustrated in FIG. 1.
Figure 5:
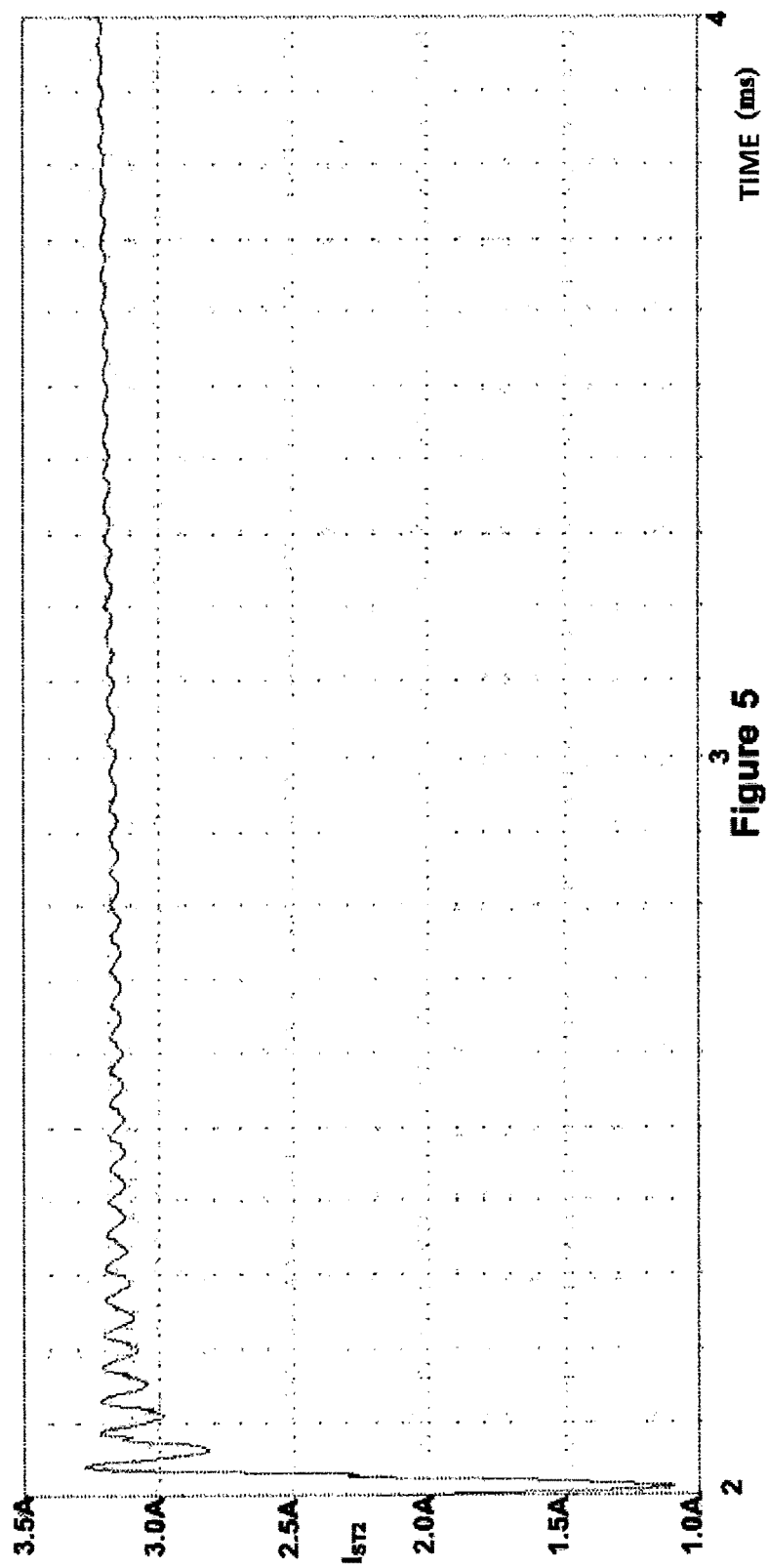
FIG. 5 illustrates the effective current in an output capacitor of the system illustrated in FIG. 1.

FIG. 4 shows the value of current IL1 flowing through the inductance 7A and the value of current IL2 flowing through the inductance 7B. FIG. 4 shows that the generation of current IL1 and IL2 is synchronized and that system 1 provides a stable output voltage VOUT and loads the energy storage device ST2 up to the requested 12V value. FIG. 5 shows an effective 3A power in an output capacitor ST2.

Figure 6:
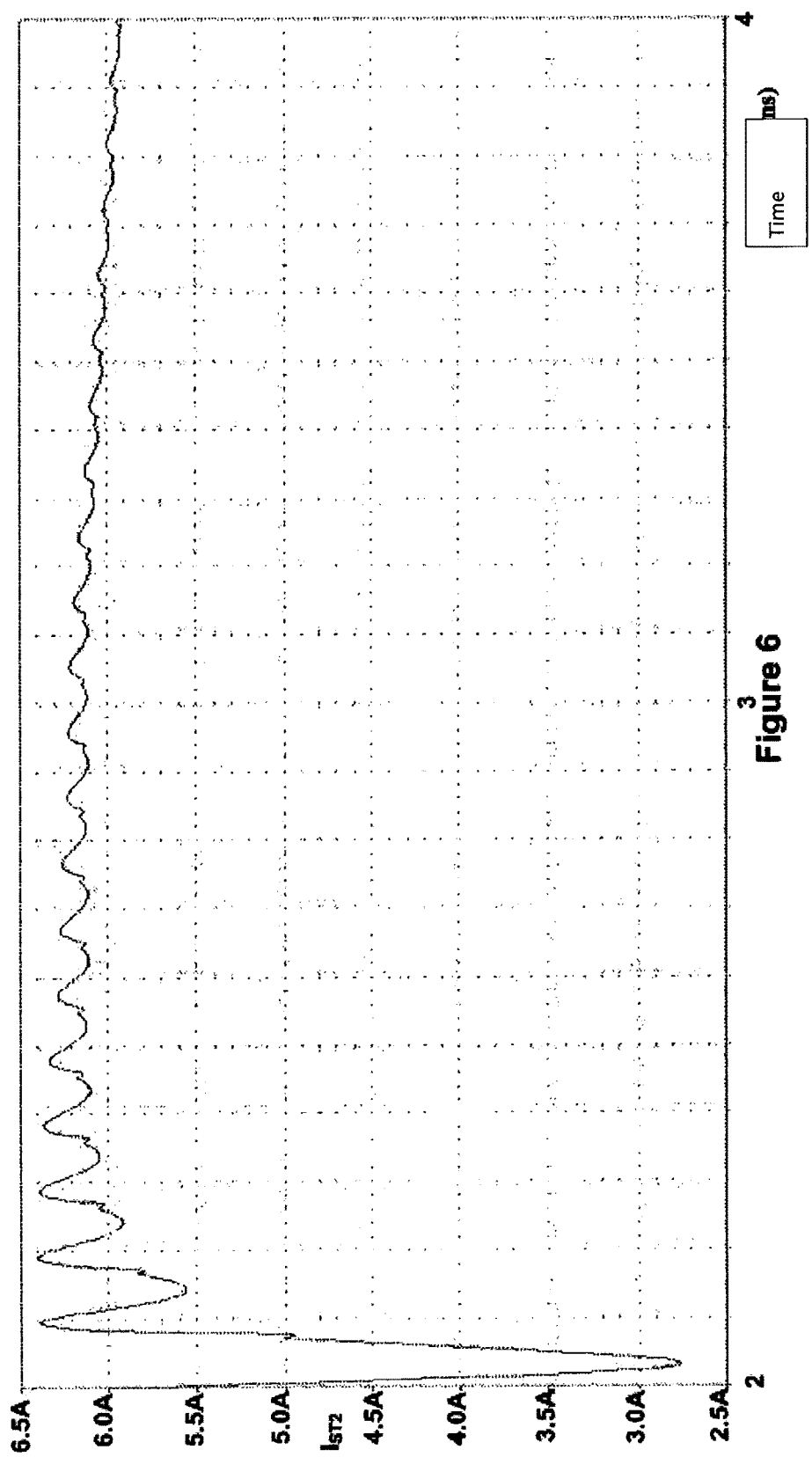
FIG. 6 illustrates the impact of a synchronization failure of the of DC/DC voltage step-down converters.
Figure 7:
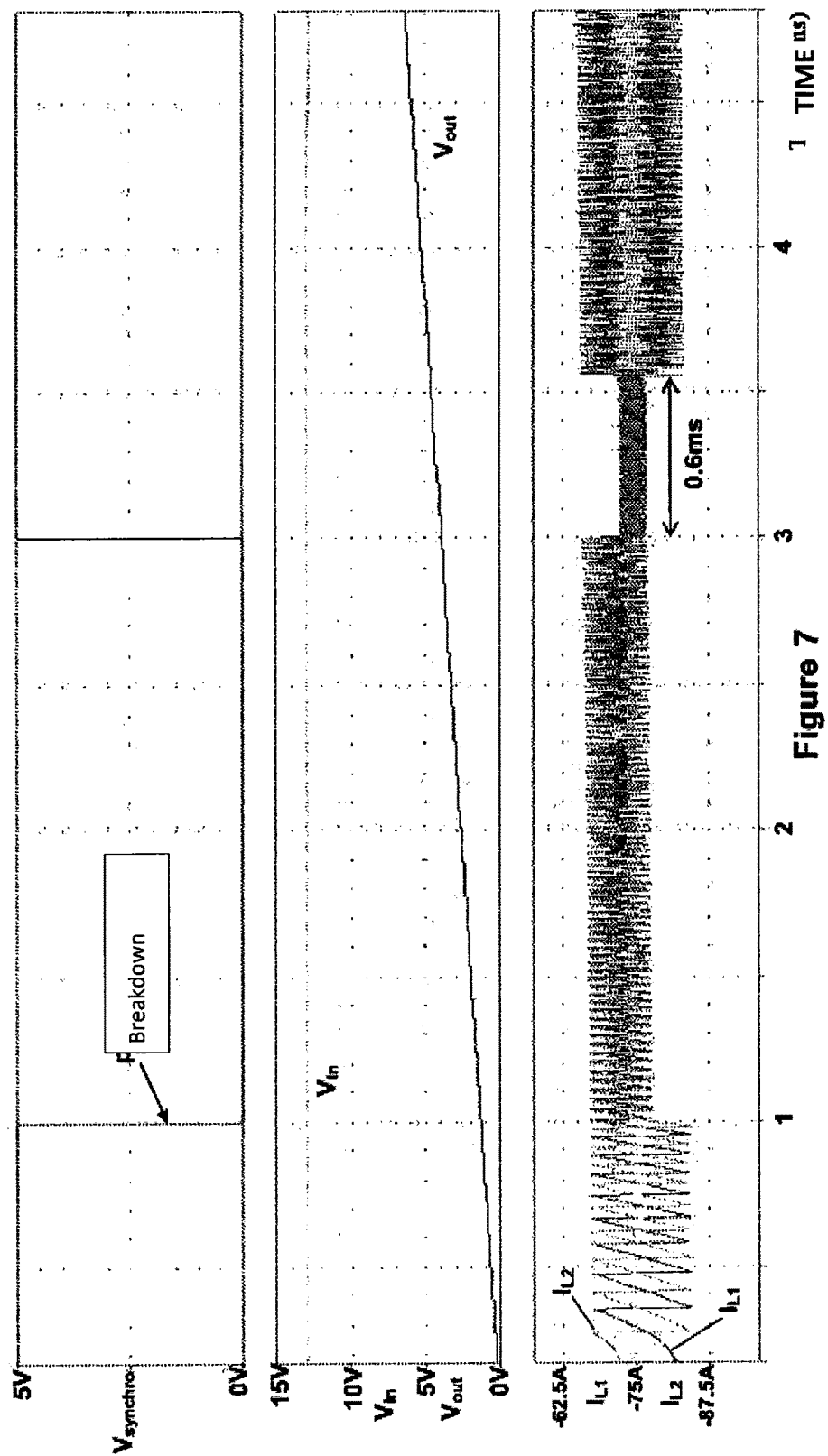
FIG. 7 illustrates the impact of a converter synchronization failure during 2 ms.

FIG. 6 illustrates the effect of a synchronization failure of the voltage step-down DC/DC converters. There is no complete stop of all converters during the outage and the effective power in the output capacity ST2 is doubled (6A). FIG. 7 illustrates a synchronization failure during 2 ms. The two step-down converters operate during the outage without interlacing. After the disappearance of the failure, the converters synchronize themselves after a delay (0.6 ms in FIG. 7).

Figure 8:
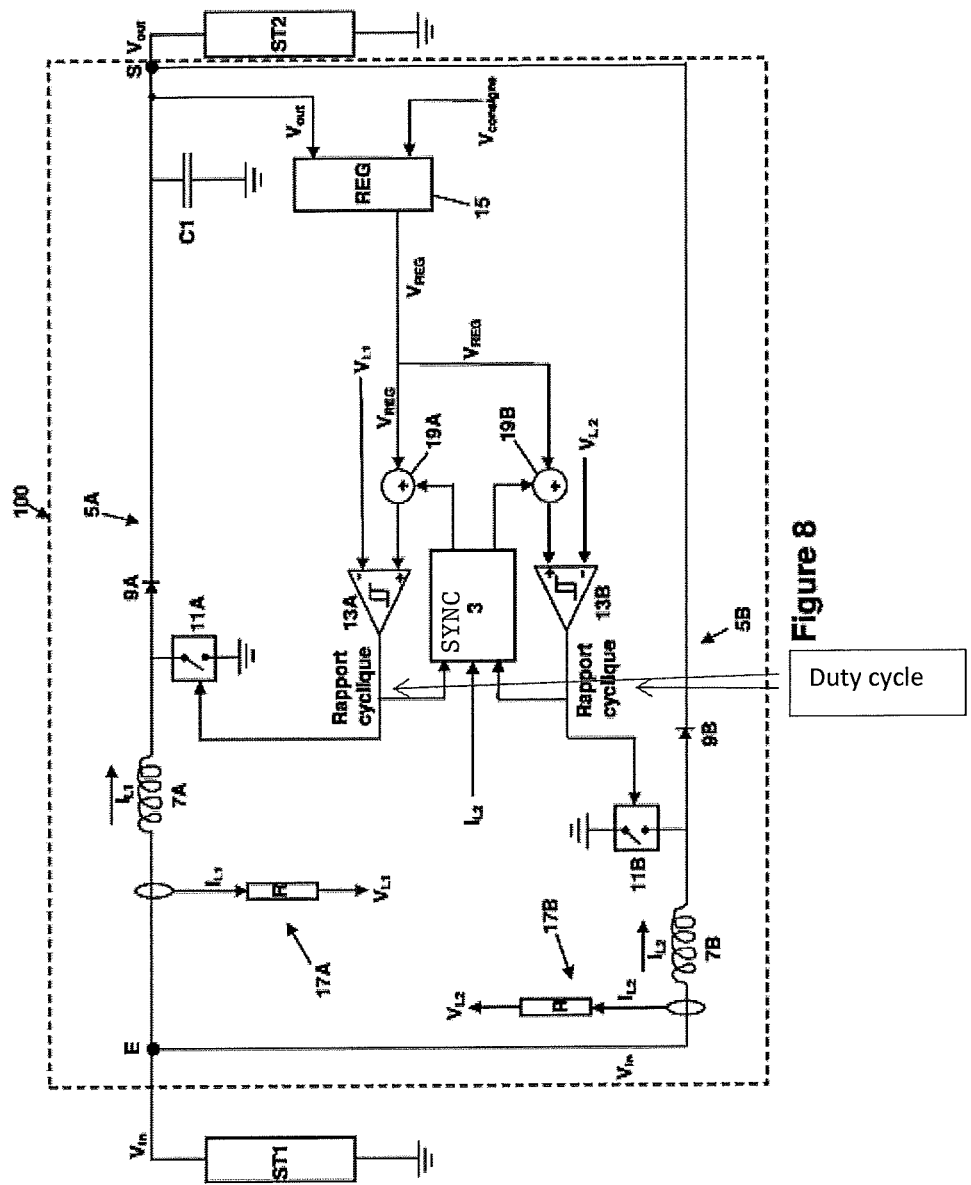
FIG. 8 illustrates a system including a synchronizing device and two voltage step-up converters according to the present invention.

The present invention also applies to a system 100 composed of a synchronizing device 3 and voltage step-up DC/DC converters as illustrated in FIG. 8. The synchronizing device is identical to the synchronizing device shown in FIG. 2 and described above.

The voltage step-up DC/DC converter differs from the voltage step-down converter 01 (as illustrated in FIG. 1) insofar as the inductance 7A, 7B is electrically connected on one side to the input terminal E and on the other side in series with the anode side of the diode 9A, 9B. The cathode side of the diode 9A, 9B is connected to the output terminal S. The switch 11A, 11B is electrically connected on one side between the diode 9A, 9B and inductance 7A, 7B and of the other side to the grounding device M.

Figure 9:
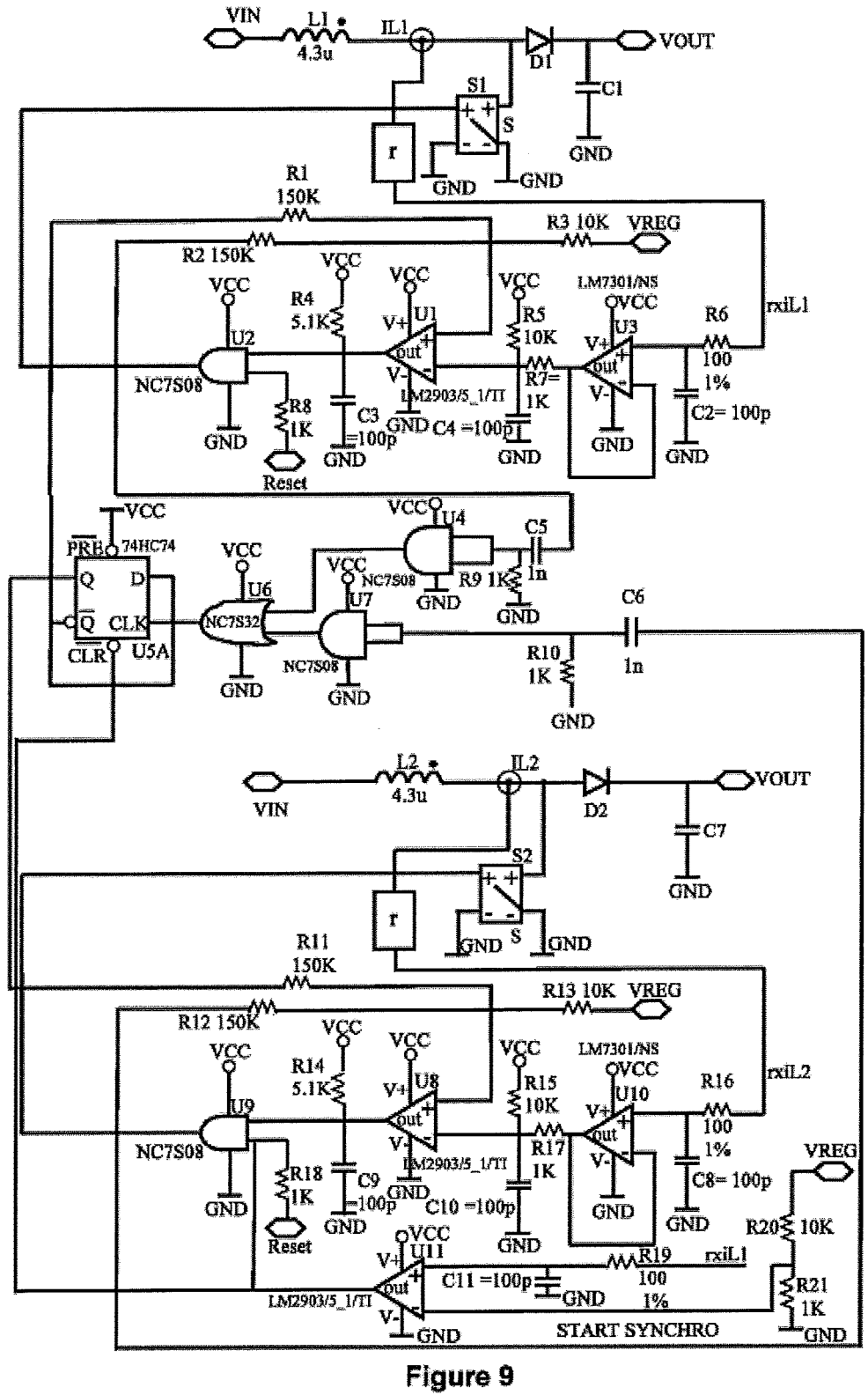
FIG. 9 illustrates an implementation example of a system including a synchronizing device and two voltage step-up converters according to the present invention.

FIG. 9 illustrates an implementation example of the system 100 including the synchronizing device 3 and voltage step-up DC/DC converters.

Figure 10:
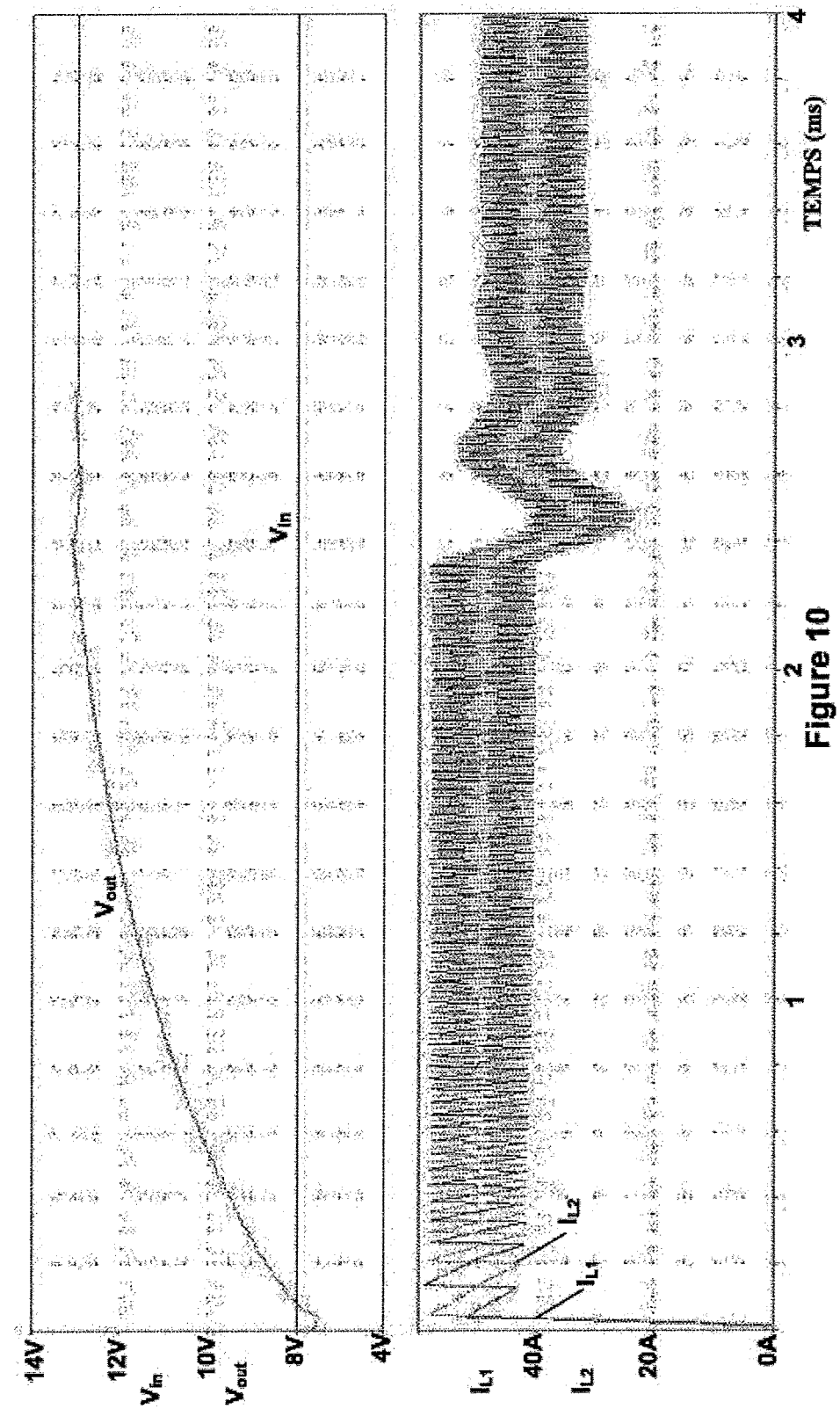
FIG. 10 illustrates the synchronized evolution of current flowing through the inductance of each voltage step-down converter for the system illustrated in FIG. 8.
Figure 11:
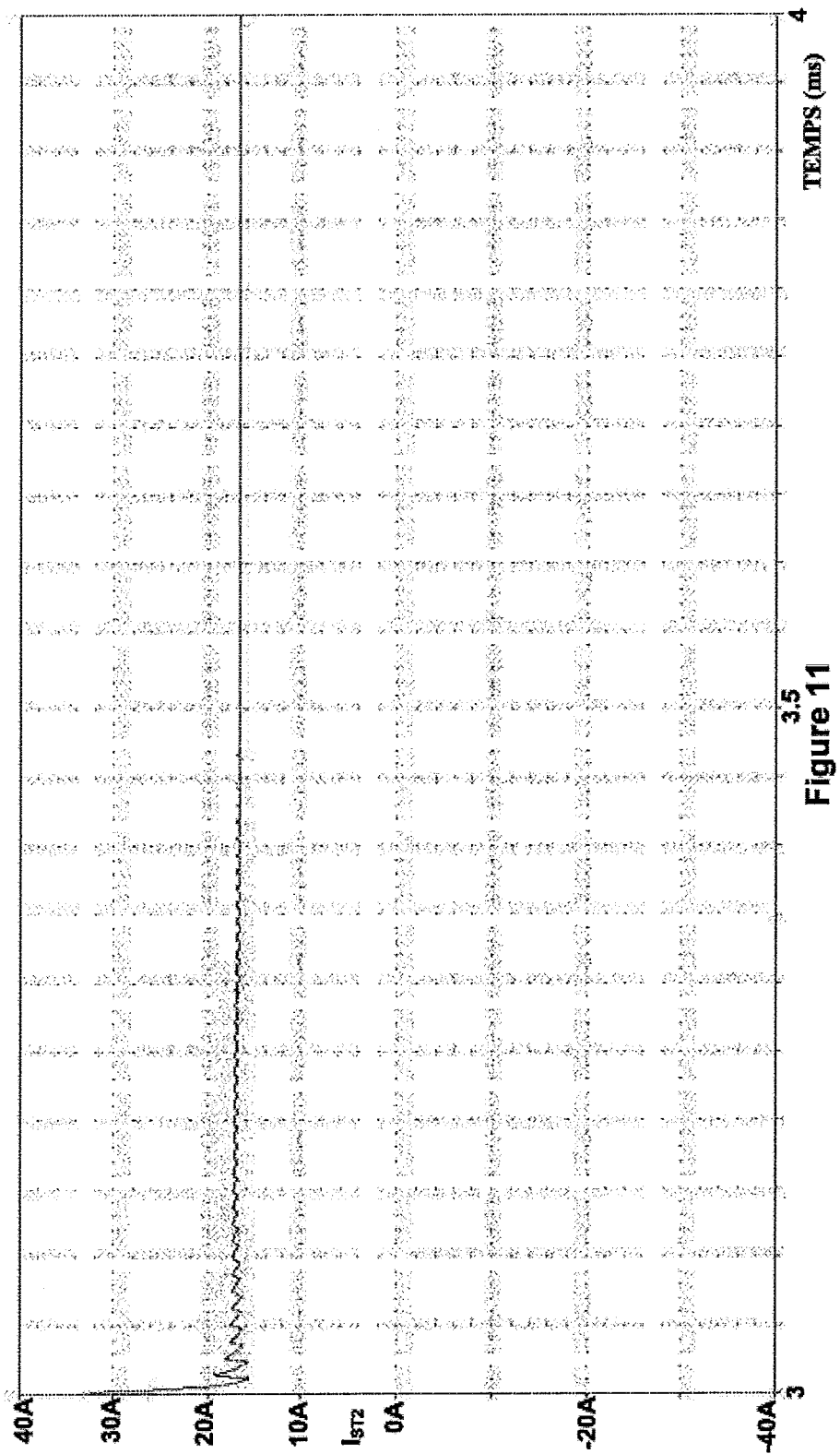
FIG. 11 illustrates the effective current in an output capacitor of the system illustrated in FIG. 8.

FIG. 10 illustrates the value of the current IL1 flowing through the inductance 7A and the value of current IL2 flowing through the inductance 7B. FIG. 10 shows that generation of current IL1 and IL2 is synchronized and that the system 100 provides a stable VOUT output voltage up to the required 13V value. FIG. 11 shows the effective current in the output capacitor ST2.

Figure 12:
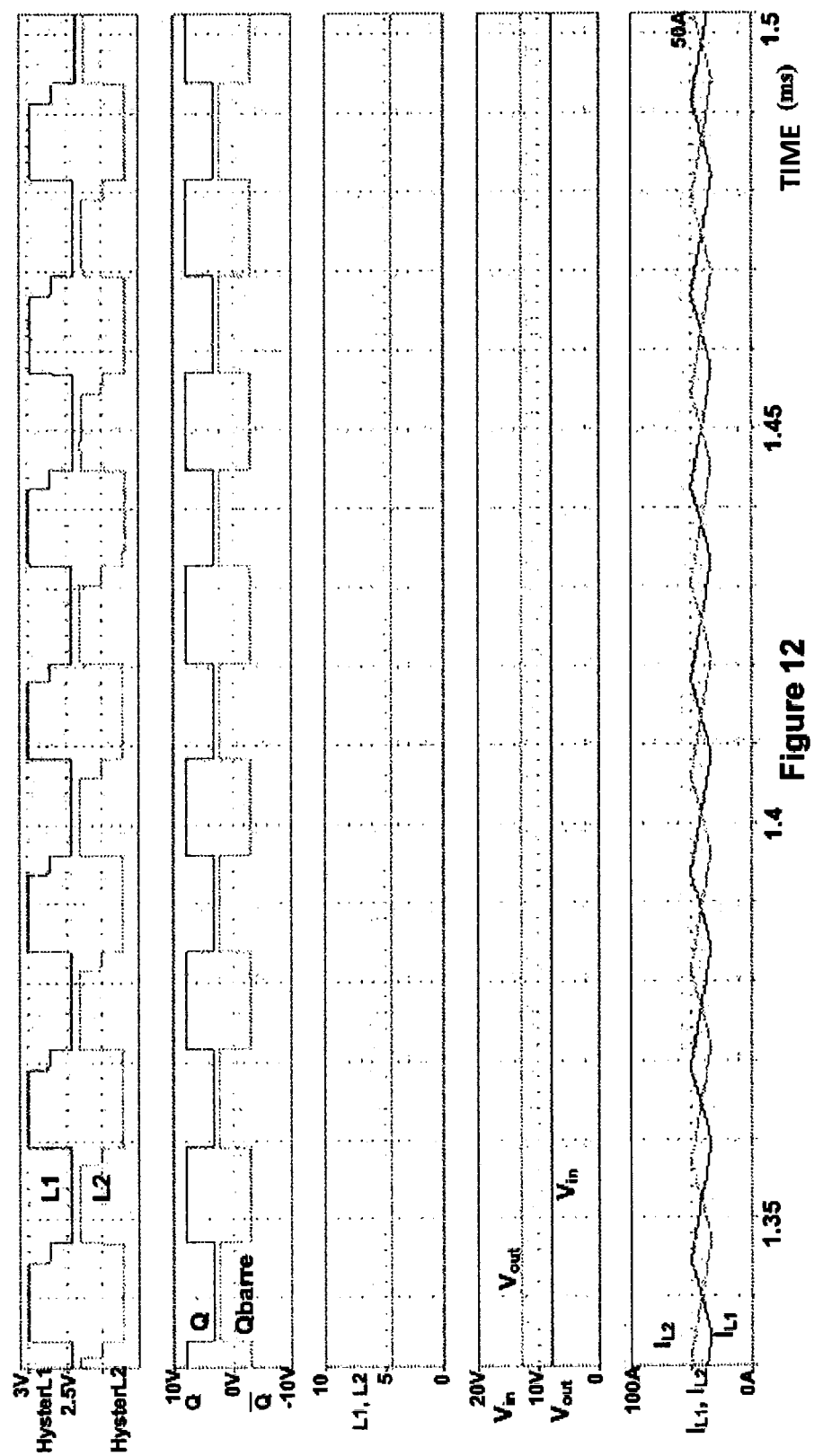
FIG. 12 illustrates the hysteresis signals, the Q and Qbarre output values, the value of the L1 inductance, the value of the L2 inductance and the currents in the L1, L2 inductances when the L1 inductance value is equal to the L2 inductance value.

FIG. 12 shows the signals from the hysteresis, the Q and Qbarre outputs values, the inductance L1 value, the inductance L2 value, and the currents in the inductances L1, L2 when inductance L1 value is equal to the inductance L2 value.

Figure 13:
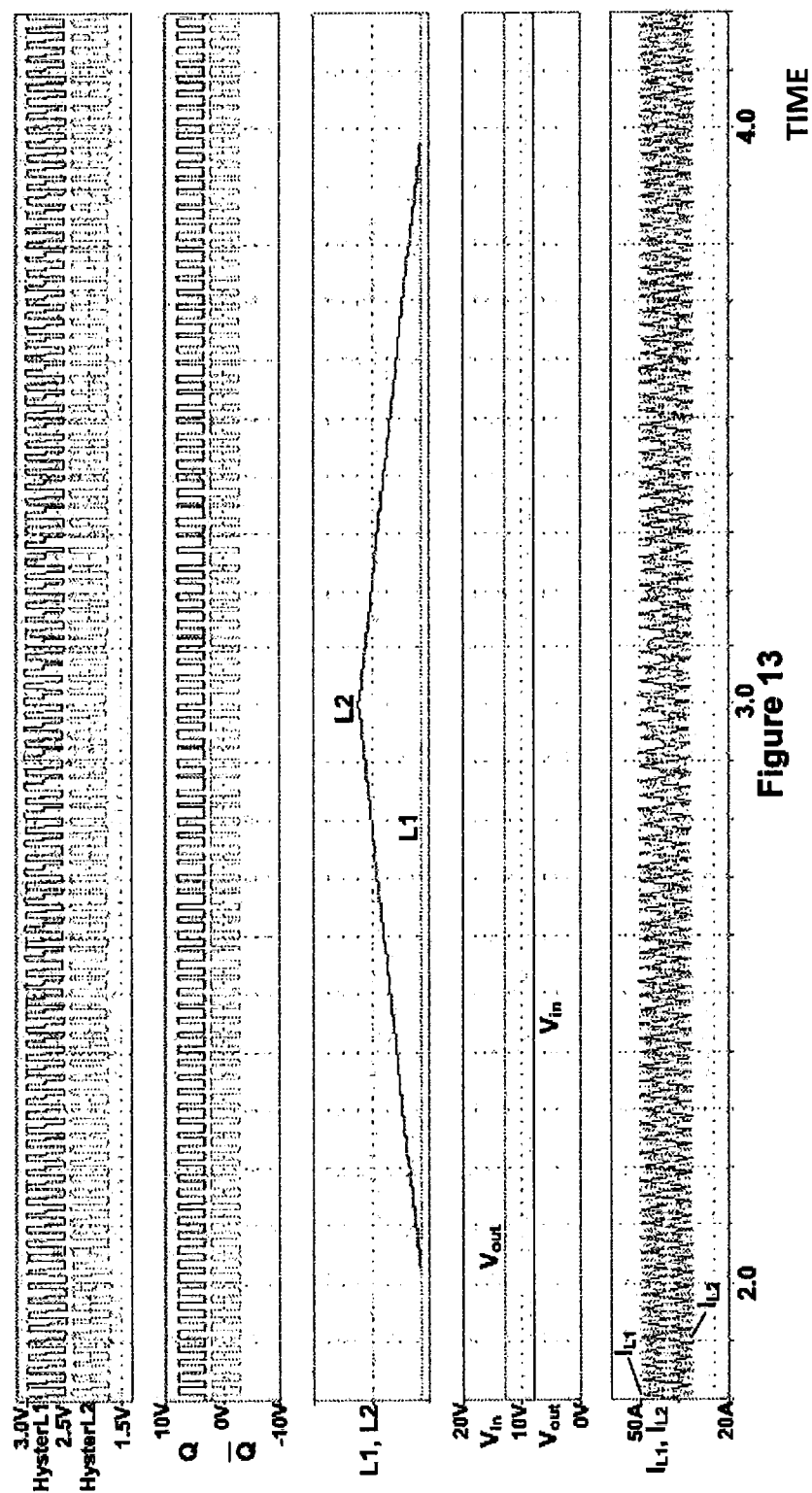
FIGS. 13 and 14 show that a deviation of +50% (self-switching) of the inductive component does not cause a synchronization stop.
Figure 14:
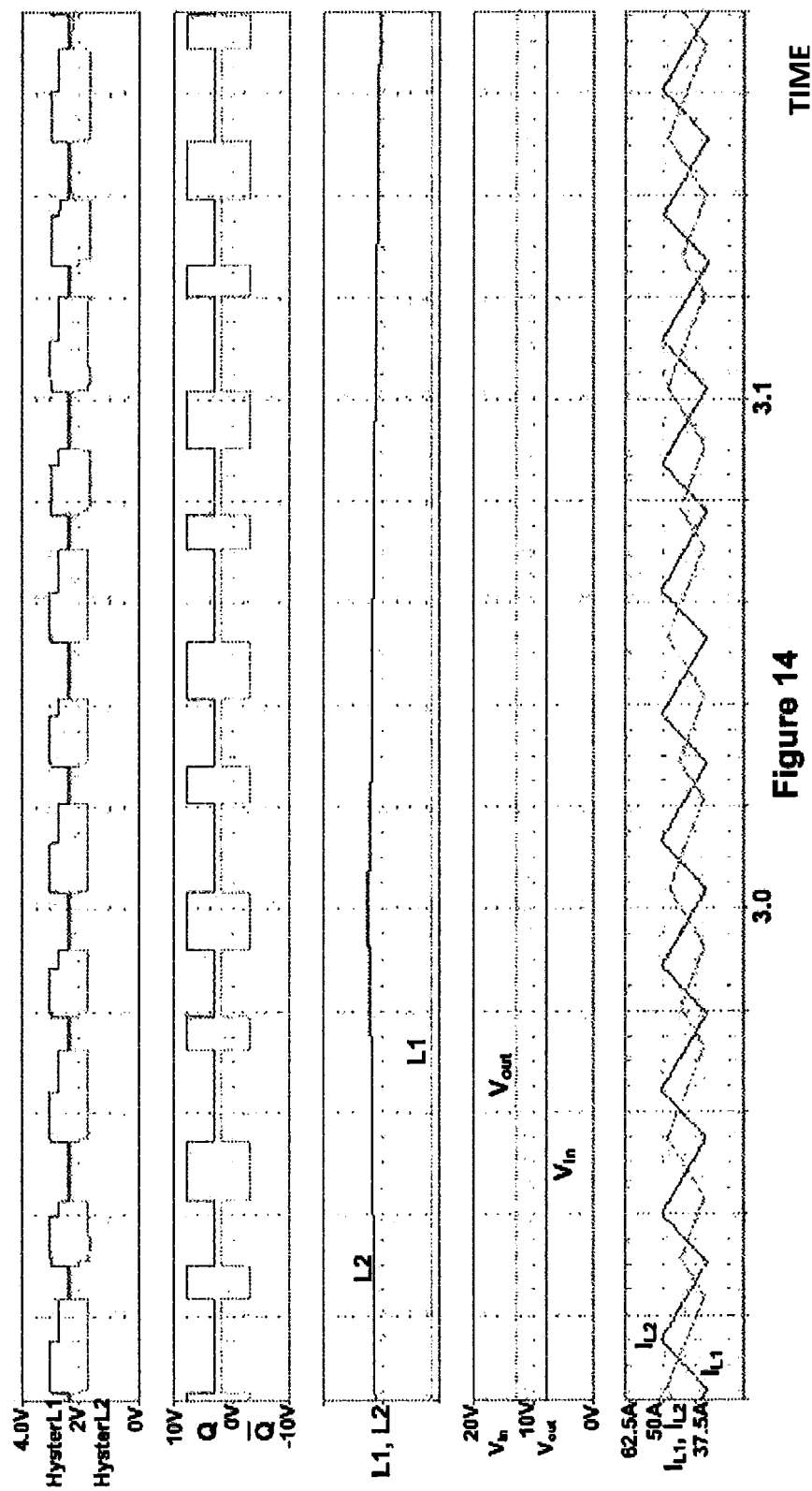

FIGS. 13 and 14 illustrate the signals from the hysteresis, the Q and Qbarre outputs values, the inductance L1 value, the inductance L2 value and the currents in the inductances L1, L2 during a deviation of inductance L1 to inductance L2 (L2=150% L1). These Figures show that a deviation of +50% of the inductive component (self-switching) does not cause a synchronization failure.

Figure 15:
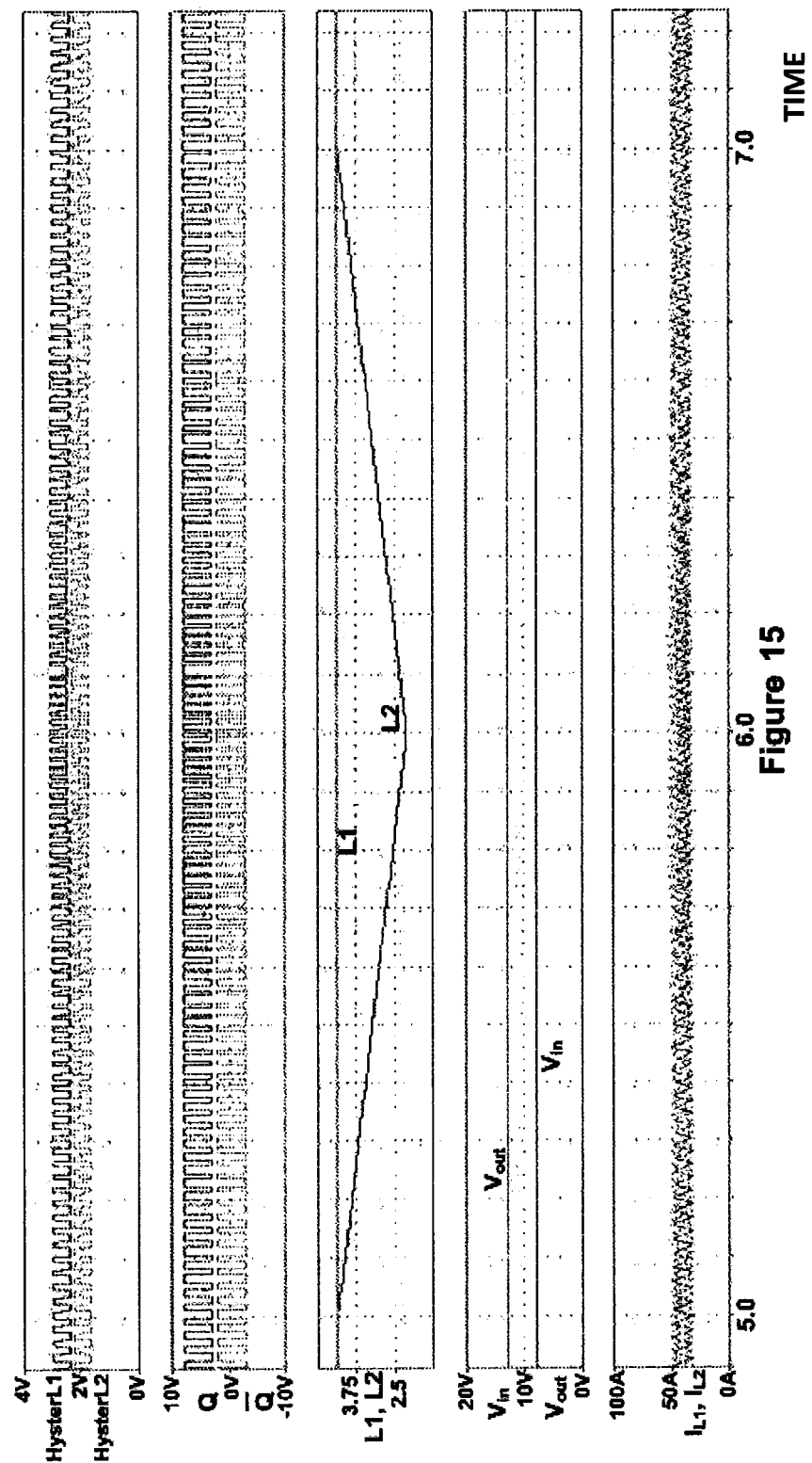
FIGS. 15 and 16 show that a deviation of −50% of the inductive component does not cause a synchronization stop.
Figure 16:
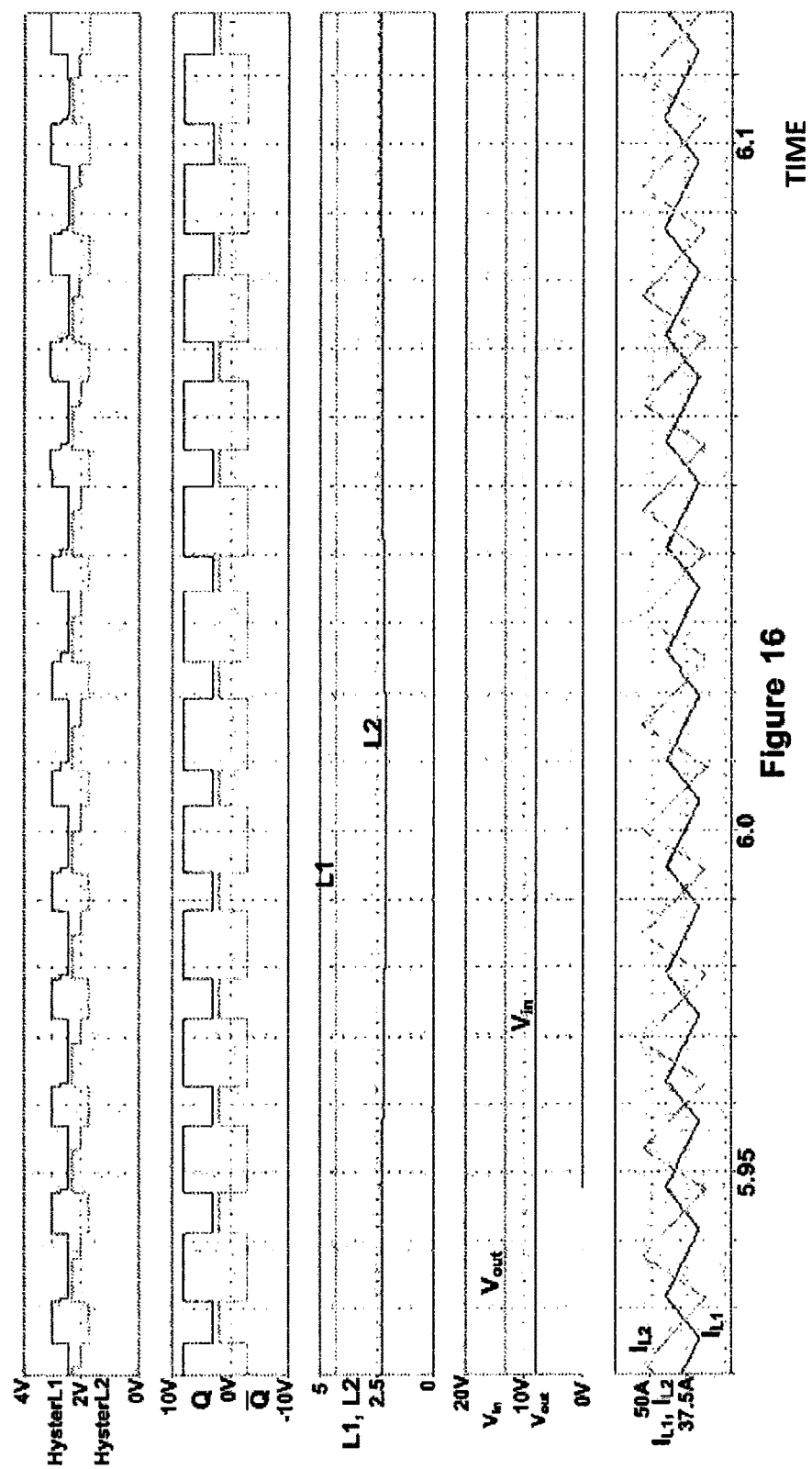

FIGS. 15 and 16 illustrate the signals from the hysteresis, the Q and Qbarre output values, the inductance L1 value, the inductance L2 value, and the currents in the inductances L1, L2 during a deviation of the inductance L1 to the inductance L2 (L1 L2=−150%). These figures show that a −50% deviation of the inductive component does not cause a synchronization failure.

The present invention thus provides a synchronizing device for synchronizing the operation of multiple variable frequency DC/DC converters throughout the entire operating frequency range of the converters. Step-down or step-up voltage converters can operate interlaced regardless of the converters' working frequency (e.g., in a range of 4 kHz to 40 kHz). In addition, a synchronization failure does not cause a forced stop of all converters. They then operate on their own respective frequency. In addition, a strong deviance of inductive component (+1-50%) (self-switching) does not cause a synchronization stop. It is thus not useful to perform synchronization calculations to correct deviance of converter component. In addition, the present invention allows reducing ripple current in the filtering ability.

It is understood that various modifications and/or improvements within the purview of one skilled in the art may be made to the various implementation methods of the invention described in the present description without departing from the framework of the invention defined by the attached claims.

For example each converter can be regulated in current mode and voltage mode. In addition, the system may include more than two converters and the synchronizing device can synchronize more than two converters.

The invention claimed is:

1. A device for synchronizing at least two variable frequency DC/DC converters comprising:
    a central receiving means for receiving a switching signal generated by each of the at least two variable frequency DC/DC converters,
    wherein said central receiving means include a differentiating circuit for processing a received switching signal from each converter, and
    wherein said central receiving means include a shaping circuit for processing a received switching signal from each converter,
    wherein said central receiving means include means to detect a type of transition from received switching signals, including an OR circuit,
    wherein said central receiving means include means for generating a synchronization signal when a transition is detected, and
    wherein said central receiving means include means for delivering the synchronization signal to one of the converters, said means being configured to deliver the synchronization signal to a different converter and in consecutive order each time a positive transition is detected.

2. A device according to claim 1, further comprising synchronization starter means capable of delivering a synchronization signal to a predetermined converter.

3. A device according to claim 2, wherein said synchronization starter means include means for receiving a value of a current flowing through an inductance of a converter through the converters and means to generate an initiation signal when the value of said current reaches a predetermined value.

4. A device according to claim 1 wherein the means for delivering the synchronization signal to one of the converters, said means being configured to deliver the synchronization signal to a different converter and in consecutive order each time a positive transition is detected, include a toggle D.

5. A system comprising a device for synchronizing at least two variable frequency DC/DC converters comprising:
    central receiving means for receiving a switching signal generated by each of the at least two variable frequency DC/DC converters,
    central receiving means to detect a type of transition from received switching signals including an OR circuit,
    central receiving means for generating a synchronization signal when a transition is detected,
    central receiving means for delivering the synchronization signal to one of the converters, said means being configured to deliver the synchronization signal to a different converter and in consecutive order each time a positive transition is detected, and
    at least two interlaced voltage step-down converters, and an adder associated with each converter for adding the synchronization signal to a control signal supplied to the converter.

6. The system of claim 5 wherein said central receiving means include a differentiating circuit for processing a received switching signal from each converter, and
    wherein said receiving means include a shaping circuit for processing a received switching signal from each converter.

7. A motor vehicle comprising:
    Said motor vehicle comprising, a device for synchronizing at least two variable frequency DC/DC converters having:
    central receiving means for receiving a switching signal generated by each of the at least two variable frequency DC/DC converters,
    central receiving means to detect a type of transition from received switching signals including an OR circuit,
    central receiving means for generating a synchronization signal when a transition is detected, and
    central receiving means for delivering the synchronization signal to one of the converters, said means being configured to deliver the synchronization signal to a different converter and in consecutive order each time a positive transition is detected.

8. The motor vehicle of claim 7 wherein said central receiving means include a differentiating circuit for processing a received switching signal from each converter, and wherein said receiving means include a shaping circuit for processing a received switching signal from each converter.

* * * * *